United States Patent [19]
Wakamoto

[11] Patent Number: 5,894,728
[45] Date of Patent: Apr. 20, 1999

[54] EXHAUST EMISSION CONTROL DEVICE FOR DIESEL ENGINES

[75] Inventor: Koutaro Wakamoto, Oyama, Japan

[73] Assignee: Komatsu Ltd., Osaka, Japan

[21] Appl. No.: 08/981,282

[22] PCT Filed: Jun. 25, 1996

[86] PCT No.: PCT/JP96/01755

§ 371 Date: Dec. 29, 1997

§ 102(e) Date: Dec. 29, 1997

[87] PCT Pub. No.: WO97/01697

PCT Pub. Date: Jan. 16, 1997

[30] Foreign Application Priority Data

Jun. 27, 1995 [JP] Japan .................... 7-183618

[51] Int. Cl.⁶ .................................................. F01N 3/00
[52] U.S. Cl. ................... 60/286; 60/290; 60/289; 60/301; 60/303; 60/307
[58] Field of Search .................... 60/285, 286, 289, 60/290, 301, 303, 307; 423/239.1

[56] References Cited

U.S. PATENT DOCUMENTS

| | | |
|---|---|---|
| 4,059,415 | 11/1977 | Kosaka et al. ................... 48/63 |
| 4,958,490 | 9/1990 | Harjunpää ................... 60/274 |
| 5,412,946 | 5/1995 | Oshima et al. ................... 60/286 |
| 5,422,085 | 6/1995 | Bell et al. ................... 423/213.5 |
| 5,524,432 | 6/1996 | Hansel ................... 60/285 |
| 5,628,186 | 5/1997 | Schmelz ................... 60/286 |

FOREIGN PATENT DOCUMENTS

| | | |
|---|---|---|
| 5-133218 | 5/1993 | Japan . |
| 6-117224 | 4/1994 | Japan . |
| 6-29547 | 4/1994 | Japan . |
| 6-123220 | 5/1994 | Japan . |
| 6-327974 | 11/1994 | Japan . |
| 6-45617 | 11/1994 | Japan . |
| 8-49531 | 2/1996 | Japan . |

*Primary Examiner*—Thomas E. Denion
*Attorney, Agent, or Firm*—Sidley & Austin

[57] ABSTRACT

The present invention is an exhaust emission control device for a diesel engine that is small and simple, and can efficiently reduce and eliminate $NO_x$ in exhaust gas. To this end, the device includes a reforming catalyst (12) for reforming either a mixture of diesel fuel and water, or a mixture of diesel fuel, water, and air to an oxygen-containing compound and for supplying the same into an exhaust pipe (2); and a $NO_x$ catalyst (3) is disposed in the exhaust pipe (2), at a position downstream from the supplying position, for reducing and controlling $NO_x$ in the exhaust gas from the diesel engine.

50 Claims, 4 Drawing Sheets

_5,894,728_

EXHAUST EMISSION CONTROL DEVICE FOR DIESEL ENGINES

TECHNICAL FIELD

The present invention relates to an exhaust emission control device for a diesel engine which eliminates NOx by reducing it to $N_2$, $H_2O$, $CO_2$, etc.

BACKGROUND ART

Conventionally, a method has been known in which the hydrocarbons in the exhaust gas are compulsorily enriched, and are brought into contact with a transition metal carrying metallo-silicate catalyst, such as a copper/zeolite catalyst, or a transition metal carrying oxide catalyst, such as a copper/alumina catalyst, to reduce and eliminate $NO_x$ in the exhaust gas. In the conventional methods, ethylene, propylene, or diesel fuel, such as kerosene and light oil, is used as the reducing agent hydrocarbon. However, in order to eliminate $NO_x$, a large amount of the reducing agent is necessary. As a concrete example, under practical conditions of diesel exhaust gas, in order to reduce and eliminate $NO_x$, a hydrocarbon weight of two and half times to four times as much as that of the $NO_x$, is necessary.

Contrary to the above, in Japanese Patent Application Laid-open No. 6-327974, it is described that the required amount of reducing agent can be substantially reduced by using an alcohol (especially ethanol) as the reducing agent. However, ethanol and propanol are more expensive as compared to ethylene and diesel fuel; and moreover it is necessary to separately prepare an additional substance as the reducing agent, so that the above art cannot be regarded as practical.

In Japanese Patent Application Laid-open No. 5-133218, it is proposed that fuel be reformed to a plurality of substances, including an alcohol which can be used as the reducing agent. However, since the reducing agent which is obtained after reforming is a kind which does not aim at an oxygen-containing compound such as, especially, an alcohol, there are disadvantages in that:

i) the yield of an oxygen-containing compound such as an alcohol is less, and
ii) caulking carbon is deposited on the surface of the reforming catalyst, so that the performance of the reforming catalyst is easily lowered.

SUMMARY OF THE INVENTION

The present invention is made to eliminate the disadvantages of the conventional art described above, and its object is to provide an exhaust emission control device for a diesel engine which is small and simple, and which efficiently reduces $NO_x$ in the exhaust gas to $N_2$, $H_2O$, and $CO_2$, to eliminate the same.

An exhaust emission control device for a diesel engine related to the present invention is an exhaust emission control device for a diesel engine including a reforming catalyst, for reforming diesel fuel, such as kerosene or the like, to reducing hydrocarbons; and for supplying the reducing hydrocarbons into an exhaust pipe; and a $NO_x$ catalyst, which is disposed in the exhaust pipe at a position downstream from the supplying position, and which reduces and controls $NO_x$ in the exhaust gas from the diesel engine, and is characterized by the reforming catalyst being a reforming catalyst which reforms either a mixture of diesel fuel and water, or a mixture of diesel fuel, water, and air, to at least one oxygen-containing compound, and supplies the oxygen-containing compound into the exhaust pipe. It is desirable that the oxygen-containing compound is an alcohol with two or more carbon atoms per molecule.

Further it is desirable that the exhaust emission control device includes: flow control means, for respectively controlling the flow of the diesel fuel, the water, and the air, and for supplying the diesel fuel, the water, and the air to the reforming catalyst; inlet temperature detecting means, for detecting the inlet temperature of the $NO_x$ catalyst; and a controller, for receiving a temperature signal from the inlet temperature detecting means and for outputting supply flow signals respectively to the flow control means. The exhaust emission control device can include a reducing agent adding nozzle, disposed in the exhaust pipe at a position upstream from the $NO_x$ catalyst; as well as a fuel tank; a water tank; and an air source, which are designed to be supply sources of the diesel fuel, the water, and the air, respectively. The reforming catalyst can be disposed in the exhaust pipe between the reducing agent adding nozzle and the point(s) of introduction of the fuel, the water, and the air. The reforming catalyst can be disposed in the exhaust pipe at the position upstream from the $NO_x$ catalyst. The exhaust emission control device for a diesel engine can include a reforming catalyst nozzle disposed in the exhaust pipe at a portion upstream from the $NO_x$ catalyst; and with reforming catalyst being attached to the reforming nozzle, the fuel tank, the water tank and the air source can be connected to the reforming catalyst nozzle through piping. The reforming catalyst can have its active components carried and held on a metal carrier.

The exhaust emission control device can include an engine speed detector for detecting the engine speed of the diesel engine, and an injection amount detector for detecting the fuel injection rate to the diesel engine; and the controller can calculate the load on the diesel engine based on the detected engine speed and the detected fuel injection rate, and can output supply flow signals respectively to the flow control means based on the calculated load. Further, the exhaust emission control device for a diesel engine can include a reforming catalyst temperature detector for detecting the temperature of the reforming catalyst, and an atmosphere temperature detector for detecting the temperature of the atmosphere; and the controller can output supply flow signals respectively to the flow control means based on at least one of the temperatures detected by the temperature detector and the calculated load. The exhaust gas control device for a diesel engine can include the reforming, catalyst temperature detecting means for detecting the temperature of the reforming catalyst, and the controller can receive temperature signals from the reforming catalyst temperature detector and the inlet temperature detector, and can output supply flow signals respectively to the flow control means.

The controller can output a command to the flow control means to supply only air for a specified time when the diesel fuel, the water, and the air are to be supplied, or it can output a command to the flow control means to supply only air when the diesel fuel and the water are not to be supplied; and by supplying only air to the reforming catalyst, the reforming catalyst, which has been deteriorated by caulking, can be regenerated. An air piping for burning caulking carbon and for regenerating the reforming catalyst can be connected to the reforming catalyst. Boost pressure of a turbocharger attached to the diesel engine can be used as an air source for supplying pressurized air to the reforming catalyst.

According to the structure of the invention described above, when adding water to diesel fuel, a mixture of the diesel fuel and water is efficiently reformed to an oxygen-containing compound. When further adding air thereto, a mixture of the diesel fuel, the water, and the air is reformed to almost twice as much oxygen-containing compound as when only fuel and water are added. Accordingly, an oxygen compound can be efficiently obtained by only providing a water tank on the vehicle. By changing the proportions of the diesel fuel, the water, and the air in response to the driving conditions of the diesel engine, and the temperature of the reforming catalyst or the $NO_x$ catalyst, a suitable amount of reducing agent can be obtained, so that $NO_x$ can be eliminated more efficiently. By supplying only air to the surface of the reforming catalyst, carbon adhered thereon during reforming is burnt, and the covering can be eliminated, so that the performance of the reforming catalyst can be restored. Further, by supplying only air to the reforming catalyst nozzle, and reducing agent coagulated by heat can be eliminated, so that reforming agent fuel in a stable condition can be added into the exhaust pipe.

BEST MODE FOR CARRYING OUT THE INVENTION

A preferred embodiment according to the present invention will be particularly described below with reference to the attached drawings.

Figure 1:
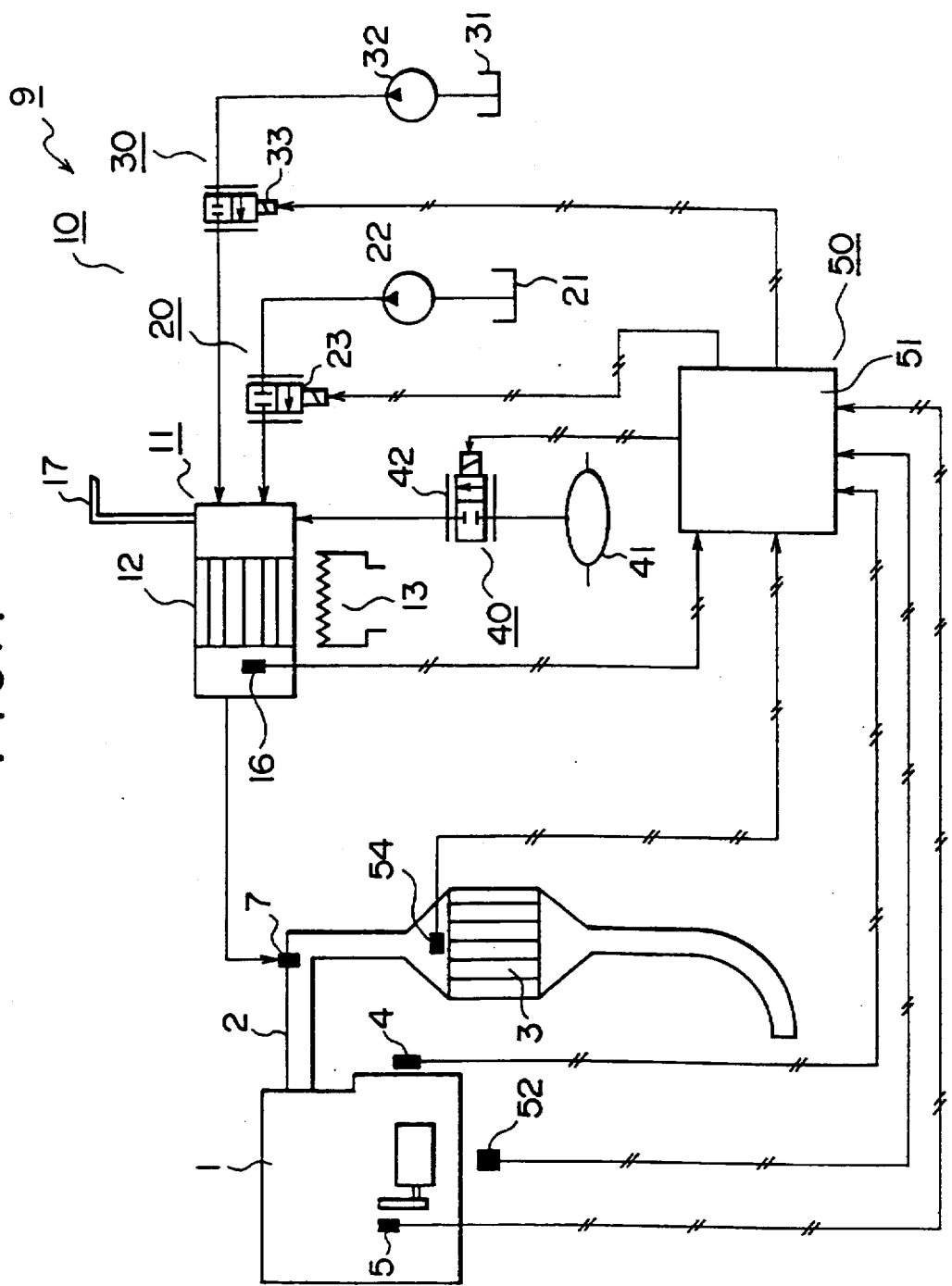
FIG. 1 is a general explanatory diagram of an exhaust emission control device relating to a first embodiment of the present invention.

FIG. 1 shows an exhaust emission control device of a first embodiment, and an exhaust pipe 2 from a diesel engine 1 is provided with $NO_x$ catalyst 3 for controlling $NO_x$ in the exhaust emission. The diesel engine 1 is provided with an engine speed sensor (engine speed detecting means) 4 for detecting the engine speed, and an injection rate detecting sensor (injection rate detecting means) 5 for detecting the fuel injection rate, which is controlled by an accelerator pedal (not illustrated in the drawing). An exhaust emission control device 9 for the diesel engine 1, which adds the reducing agent to the exhaust gas, is placed between the diesel engine 1 and the $NO_x$ catalyst 3. The exhaust emission control device 9 includes a reducing agent adding nozzle 7, a reforming catalyst section 10, and a control section 50. The reducing agent adding nozzle 7 is attached to the exhaust pipe 2 between the diesel engine 1 and the $NO_x$ catalyst 3.

Figure 2A:
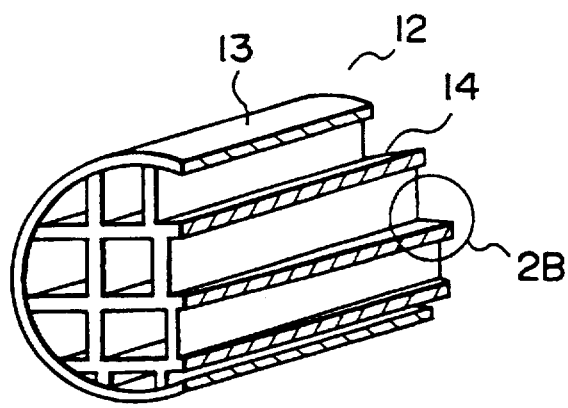
FIGS. 2A and 2B show a reforming catalyst relating to the first embodiment; with FIG. 2A being a perspective view of a section of one part, and with FIG. 2B being a sectional view of a metal carrier portion which is an enlargement of the portion 2B in FIG. 2A.
Figure 2B:
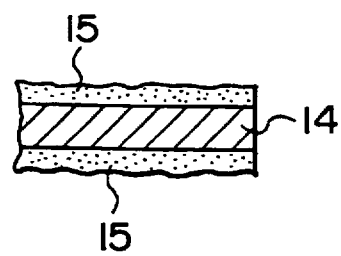

The reforming catalyst section 10 includes a reforming catalyst layered portion 11, a fuel supplying portion 20, a water supplying portion 30, and an air supplying portion 40. The reforming catalyst layered portion 11 comprises a reforming catalyst 12 and an electric heater 13 for heating the reforming catalyst 12. As FIGS. 2A and 2B show, the reforming catalyst 12 comprises a metal carrier 14 in a honey-comb form which is housed in the container 13, and a catalyst 15 comprising a silica-alumina catalyst, a nickel catalyst, a tungsten catalyst, or the like. The passages through the metal carrier 14 can have a polygonal shape, such as a triangle, a quadrangle (equivalent to the shape of passages in the metal carrier 14 in FIG. 2A), and a hexagon, and the carrier 14 can be of a material such as a foam metal or a porous metal. As FIG. 2B shows, the catalyst 15 can be arranged in a layer form on the metal carrier 14 with a porous inorganic refractory compound such as γ-alumina carrying fine particles such as silica-alumina series, nickel, or tungsten which is dispersed thereon.

The reforming catalyst layered portion 11 is provided with a reforming catalyst temperature sensor (reforming catalyst temperature detecting means) 16 for measuring the temperature of the reforming catalyst 12. Further, a purging piping 17 is connected to the reforming catalyst layered portion 11, and the purging piping 17 is piping used specifically for sending purging air to regenerate the catalyst 15 which has been deteriorated by caulking.

The fuel supplying portion 20 comprises a fuel tank 21, a fuel pump 22, and a fuel flow control valve (flow control means) 23 for controlling the flow of fuel to be supplied. A tank housing the fuel for operating the engine can be also used as the fuel tank 21. The water supplying portion 30 comprises a water tank 31, a water pump 32, and a water flow control valve (flow control means) 33 for controlling the flow of the water to be supplied. An air supplying portion 40 comprises a compressor (air source) 41, and an air flow control valve (flow control means) 42 for controlling the flow of the air to be supplied.

The control section 50 includes a controller 51, the engine speed sensor 4, the injection rate detecting sensor 5, and an atmosphere temperature sensor (atmosphere temperature detecting means) 52. Receiving a signal from the engine speed sensor 4, the injection rate detecting sensor 5, and the atmosphere temperature sensor 52, the controller 51 obtains the proportions of the fuel, the water, and the air which are memorized in a memory section, and outputs commands to the fuel flow control valve 23, the water flow control valve 33, and the air flow control valve 42.

As for another method, the controller 51 includes an inlet temperature detecting sensor (inlet temperature detecting means) 54 for detecting the inlet temperature of the $NO_x$ catalyst 3 in the exhaust pipe 2, and after receiving an exhaust emission temperature signal from the inlet temperature detecting sensor 54, the controller 51 outputs commands to the fuel flow control valve 23, the water flow control valve 33, and the air flow control valve 42. The reforming catalyst temperature sensor 16 is connected to the controller 51.

In the structure described above, the operation of the first embodiment will be explained.

Based on the signals from the engine speed sensor 4 and the injection rate detecting sensor 5, the engine speed of the diesel engine 1 which is rotating and producing an output, and the driving conditions, such as the load acting on the engine 1, are obtained from the controller 51. The controller 51 also receives the signal from the atmosphere temperature sensor 52, and obtains the flow rate of the exhaust gas which is exhausted from the diesel engine 1, and the inlet temperature of the $NO_x$ catalyst 3 from a map memorized in the memory section to obtain the amount of reducing agent to be added to the exhaust emission. Alternatively, the controller 51 obtains the flow rate of the exhaust emission, and receives the exhaust gas temperature from the inlet temperature detecting sensor 54 of the $NO_x$ catalyst 3 to obtain the amount of reducing agent to be added to the exhaust gas. When the necessary amount of the reducing agent is obtained, the controller 51 obtains the proportions of the diesel fuel, the water, and the air which are memorized in the memory section, and outputs commands to the fuel flow control valve 23, the water flow control valve 33, and the air flow control valve 42, thereby supplying a predetermined amount of the diesel fuel and a predetermined amount of the water, or predetermined amounts of each of the diesel fuel, the water, and the air to the reforming catalyst layered portion 11, and obtaining a necessary amount of reducing agent of a specified oxygen-containing compound.

At this time, by adding fuel hydrocarbon (R—H), e.g. diesel fuel, and water ($H_2O$) to the catalyst 15 of the reforming catalyst layered portion 11, which is warmed by the electric heater 13 to be a substantially constant temperature, the fuel hydrocarbon reacts with the water based on the chemical formula (1), and is efficiently reformed to an oxygen-containing compound (R'OH). By adding additional air ($o_2$), the fuel hydrocarbon reacts with the water and the air based on the chemical formula (2), and is reformed to twice as much of the oxygen-containing compound (R'OH) as in the above. The catalyst 15, which is heated by the electric heater 13, is carried by the metal carrier 14, which is made of metal, so that the heat conductive efficiency is enhanced and the power consumption can be reduced.

$$R-H+H_2O \rightarrow R'OH+R''H \qquad (1)$$

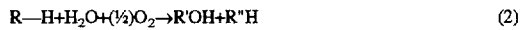

$$R-H+H_2O+(\tfrac{1}{2})O_2 \rightarrow R'OH+R''H \qquad (2)$$

A required amount of reducing agent, i.e. the reformed oxygen-containing compound (R'OH), is sent to the reducing agent adding nozzle 7, and is added into the exhaust pipe 2. The added oxygen-containing compound (R'OH) reacts with $NO_x$ in the exhaust gas in the presence of the $NO_x$ catalyst 3, and efficiently reduces $NO_x$ to $N_2$, $H_2O$, and $CO_2$, so that $NO_x$ in the exhaust gas is eliminated.

In the above, when the temperature of the exhaust gas is 300° C. or less, or when the engine speed is low, and when less load is acting on the engine, the controller 51 outputs commands to close (to stop the flow) to the fuel flow control valve 23 and the water flow control valve 33, and outputs a command to open (to start or maintain the flow) to the air flow control valve 42, thereby burning any carbon which covers the surface of the catalyst 15, and eliminating any reducing agent which adheres on the reducing agent adding nozzle 7 and is coagulated by heat, thereby regenerating the catalyst 15 and recovering the performance thereof.

In the above, the air flow control valve 42 is used, but purging air can be sent from the purging piping 17 specifically designed for purging. Further the controller 51 may control the electric heater 13 based on the signal from the catalyst temperature sensor 16 so that the temperature of the catalyst 15 is kept constant. Furthermore, the controller 51 can measure the temperature of the catalyst 15 and can change the proportions of the diesel fuel, the water, and the air as described below.

Next, the second embodiment according to the present invention will be explained. In the first embodiment, the reducing agent adding nozzle 7 and the reforming catalyst layered portion 11 are separately placed, but the second embodiment differs in the point that the reforming catalyst is placed at the nozzle. In addition, in the first embodiment, the air supplying portion 40 supplies pressurized air by means of a compressor 41, but in the second embodiment, the boost pressure of a turbocharger is used as the pressurized air source.

Figure 3:
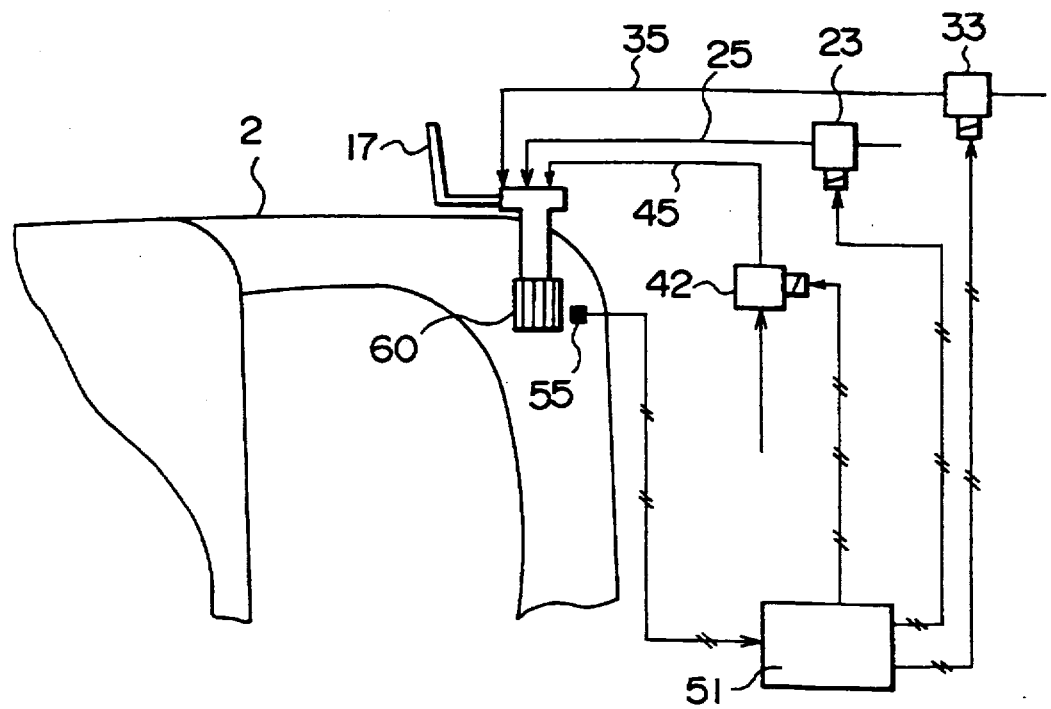
FIG. 3 is an explanatory diagram of an essential portion of the exhaust emission control device related to a second embodiment of the present invention.

In FIG. 3, a reforming catalyst nozzle 60 is inserted into and attached at the inside of the exhaust pipe 2. In the vicinity of the reforming catalyst nozzle 60, a nozzle temperature detecting sensor 55 is placed to measure the temperature of the reforming catalyst nozzle 60. The nozzle temperature detecting sensor 55 is connected to the controller 51. A piping 25 of the fuel supplying portion 20, a piping 35 of the water supplying portion 30, and a piping 45 from the boost pressure of a turbocharger (not illustrated in the drawings), which supplies air, are connected to the reforming catalyst nozzle 60.

Figure 4:
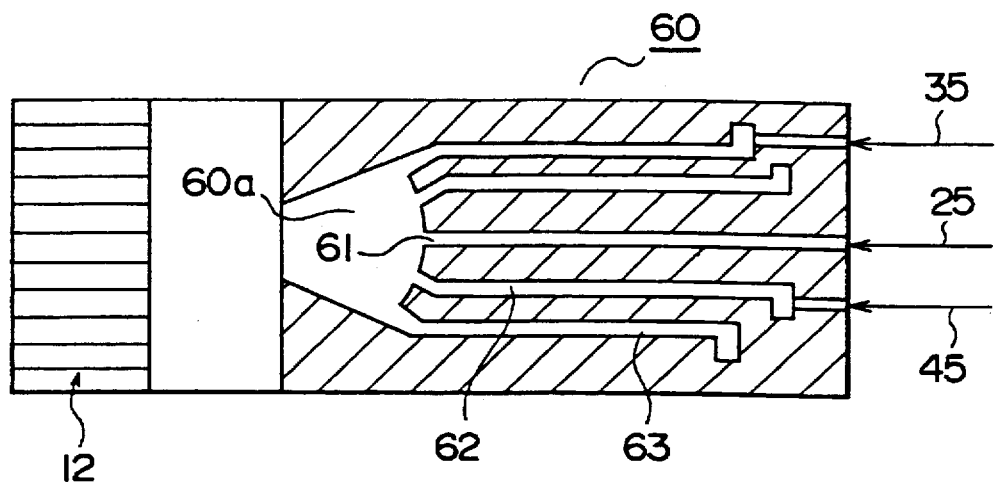
FIG. 4 is a sectional view of a reforming catalyst nozzle related to the second embodiment.

The reforming catalyst nozzle 60 is, for example, as FIG. 4 shows, constructed in a cylindrical form, and at the center thereof, a passage 61 for flowing fluid such as fuel is disposed, while at the outside of the passage 61, a ring-shaped passage 62 for flowing air is disposed, and further at the outside of the passage 62, a ring-shaped passage 63 for flowing water is disposed. By jetting air out from the passage 62 between the passage 61 and the passage 63, the passage 61 and the fluid flowing therein are sucked, and the fluid is excellently agitated at a foremost end portion 60a of the nozzle 60. This arrangement can be changed. At the exit of the reforming catalyst nozzle 60, the reforming catalyst 12 is attached. Accordingly, the nozzle temperature detecting sensor 55 also has the role of the reforming catalyst temperature sensor (reforming catalyst temperature detecting means) 16 which measures the temperature of the reforming catalyst 12.

The operation of the second embodiment in the above structure will be explained.

Figure 5:
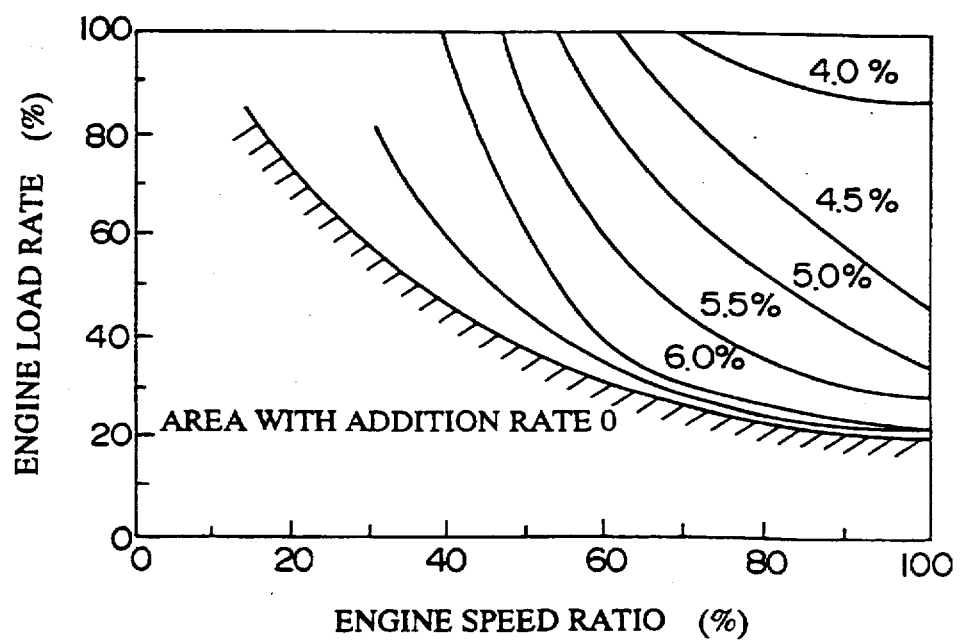
FIG. 5 is a graph showing one example of a way to obtain a reducing agent adding amount based on an engine speed ratio and an engine load ratio, which is related to the second embodiment.

Similarly to the first embodiment, the required amount of reducing agent of a specified oxygen-containing compound is obtained by the controller 51 based on the engine speed, the driving conditions such as the load acting on the engine, and the temperature of the atmosphere. The controller 51 obtains the adding amount from a reducing agent adding amount map shown in FIG. 5, based on, for example, the engine speed and the load acting on the engine 1. FIG. 5 shows the adding rate of the reducing agent relative to the fuel injection rate to the engine 1 by curved lines with the axis of abscissa showing the engine speed ratio (ratio to the rated speed of revolution) and the axis of ordinates showing the load factor of the engine 1.

The proportions of the diesel fuel, the water, and the air are obtained as follows. Since the reforming catalyst nozzle 60 is inserted into and attached in the inside of the exhaust pipe 2, the temperature of the reforming catalyst nozzle 60 differs according to the driving conditions. Here, when diesel fuel is reformed by using air, if a temperature Tc of the reforming catalyst is too high, the fuel hydrocarbon reacts with the air based on the chemical formula (3), and a side reaction is easy to be advanced, so that reforming efficiency is decreased.

$$R-H+O_2 \rightarrow H_2O+CO_x \qquad (3)$$

(Here, x is 1 or 2.)

Figure 6:
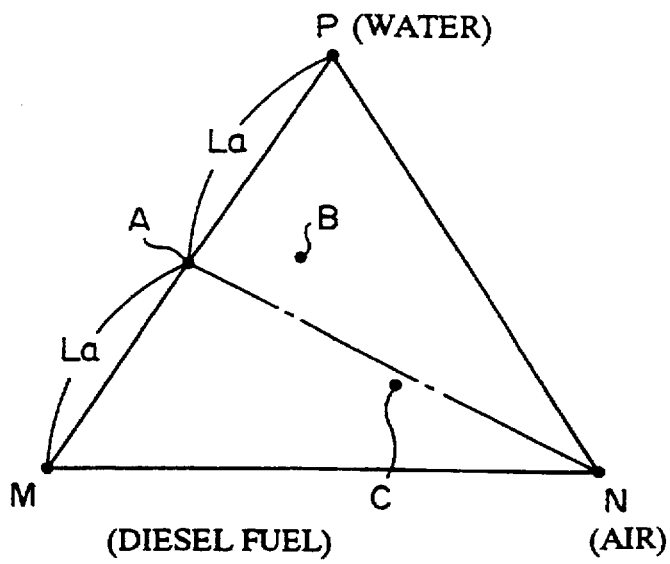
FIG. 6 is a matrix diagram for obtaining the proportions of diesel fuel, water, and air related to the second embodiment.

Consequently, the controller 51 obtains the proportions of the diesel fuel, the water, and the air from, for example, a matrix shown in FIG. 6 in response to the temperature Tc of the reforming catalyst. The matrix is formed in a triangular form, and each of vertexes P, M, and N shows the diesel fuel, the water, and the air, and at the vertexes P, M, and N respectively have 100% of diesel fuel, water, and air. It is shown that a point A, which has an equal distance La from each of the vertexes P and M, has 50% of diesel fuel, 50% of water, and 0% of air.

For example, when the temperature Tc of the reforming catalyst is high, the controller 51 obtains a point B at which the order of predominance in the proportions is i) water, ii) diesel fuel, and iii) air. On the other hand, when the temperature Tc is low, the controller obtains a point C at which the order of predominance in the proportions is i) air, ii) diesel fuel, and iii) water. Thus, based on the temperature Tc of the reforming catalyst, the proportions of the diesel fuel, the water, and the air are changed.

Figure 7:
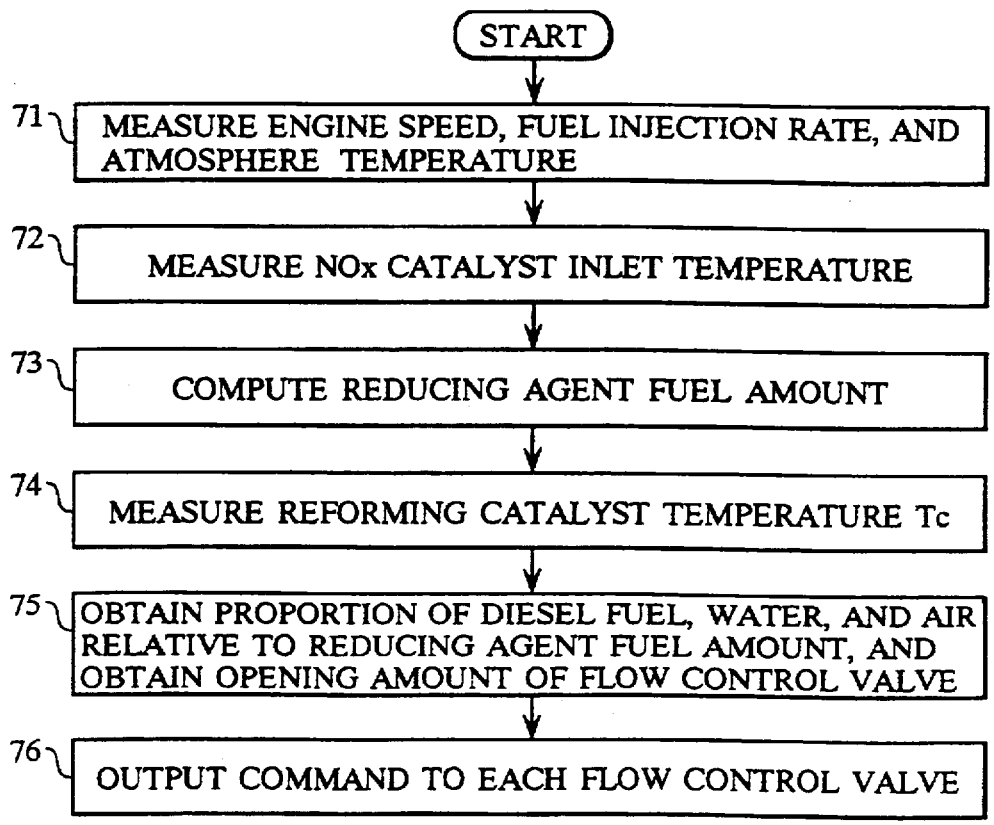
FIG. 7 is a flow chart related to the second embodiment.

The above control will be explained with reference to a flow in FIG. 7.

In Step 71, the engine speed and the fuel injection rate are measured to ascertain the driving conditions, and the temperature of the atmosphere is measured to ascertain the working environment. In Step 72, the inlet temperature of the $NO_x$ catalyst 3 is measured. In Step 73, based on the measured value in Step 71, or in Steps 71 and 72, the required amount of reducing agent of a specified oxygen-containing compound is computed. In Step 74, the temperature Tc of the reforming catalyst is measured. In Step 75, the proportions of the diesel fuel, the water, and the air relative to the required amount of reducing agent of a specified oxygen-containing compound are obtained, and the opening degree of each of the flow control valves 23, 33, and 42 is obtained. In Step 76, a command, in response to the opening degree which has been obtained, is outputted to each respective one of the flow control valves 23, 33, and 42.

The reforming catalyst is regenerated, and the reducing agent adhered on the nozzle is eliminated in the same way as in the first embodiment. Industrial Availability The present invention is useful as an exhaust emission control device for a diesel engine, with a small and simple structure, by which an oxygen-containing compound is produced in response to the driving conditions of the engine and the temperature of a $NO_x$ catalyst, and by which $NO_x$ is efficiently reduced and eliminated.

That which is claimed is:

1. An exhaust emission control device for a diesel engine having an exhaust pipe, said exhaust emission control device comprising:

a fuel tank for containing diesel fuel;

a water tank for containing water;

a reforming catalyst for reforming diesel fuel to at least one reducing agent, said reforming catalyst being a reforming catalyst which reforms a mixture of diesel fuel and water to at least one oxygen-containing reducing agent;

pipings for supplying diesel fuel from said fuel tank and water from said water tank to said reforming catalyst and for supplying resulting reducing agents into exhaust gas in said exhaust pipe at a supplying position; and a $NO_x$ catalyst which is disposed in said exhaust pipe at a position downstream from said supplying position, and which reduces and controls $NO_x$ in exhaust gas from the diesel engine.

2. An exhaust emission control device for a diesel engine in accordance with claim 1, wherein said reforming catalyst is disposed in said exhaust pipe at a position upstream from said $NO_x$ catalyst.

3. An exhaust emission control device for a diesel engine in accordance with claim 2, further comprising:

a reforming catalyst nozzle disposed in said exhaust pipe at a position upstream from said $NO_x$ catalyst; and wherein said reforming catalyst is attached at said reforming catalyst nozzle; and wherein said pipings connect said fuel tank and said water tank to said reforming catalyst nozzle.

4. An exhaust emission control device for a diesel engine in accordance with claim 3, further comprising:

a fuel flow controller for controlling a flow of diesel fuel from said fuel tank to said reforming catalyst;

a water flow controller for controlling a flow of water from said water tank to said reforming catalyst;

an engine speed detector for detecting an engine speed of said diesel engine;

an injection rate detector for detecting an injection rate of diesel fuel to said diesel engine; and a load responsive controller, for calculating a load on said diesel engine based on a thus detected engine speed and a thus detected fuel injection rate, and for outputting supply flow signals to said fuel flow controller and said water flow controller, respectively, based on a thus calculated load.

5. An exhaust emission control device for a diesel engine in accordance with claim 4, further comprising:

a reforming catalyst temperature detector for detecting a temperature of said reforming catalyst; and wherein said load responsive controller outputs supply flow signals to said fuel flow controller and said water flow controller, respectively, based on the calculated load and a thus detected temperature of said reforming catalyst.

6. An exhaust emission control device for a diesel engine in accordance with claim 4, further comprising:

an atmospheric temperature detector for detecting an atmospheric temperature; and wherein said load responsive controller outputs supply flow signals to said fuel flow controller and said water flow controller, respectively, based on the calculated load and a thus detected atmospheric temperature.

7. An exhaust emission control device for a diesel engine in accordance with claim 4, further comprising:

an inlet temperature detector for detecting an inlet temperature of said $NO_x$ catalyst; and wherein said load responsive controller receives a temperature signal from said inlet temperature detector and outputs respective supply flow signals to said fuel flow controller and said water flow controller, based on the thus calculated load and a thus detected inlet temperature.

8. An exhaust emission control device for a diesel engine in accordance with claim 4, further comprising at least one of:

a reforming catalyst temperature detector for detecting a temperature of said reforming catalyst;

an atmospheric temperature detector for detecting an atmospheric temperature; and an inlet temperature detector for detecting an inlet temperature of said $NO_x$ catalyst; and wherein said load responsive controller receives a temperature signal from said at least one and outputs respective supply flow signals to said fuel flow controller and said water flow controller, based on the thus calculated load and a thus detected temperature which is detected by said at least one.

9. An exhaust emission control device for a diesel engine in accordance with claim 1, further comprising:

a source of pressurized air; and a controller for effecting a flow of air from said source to said reforming catalyst at a time when water and diesel fuel are not being supplied to said reforming catalyst, in order to regenerate said reforming catalyst.

10. An exhaust emission control device for a diesel engine in accordance with claim 1, further comprising:

a fuel flow controller for controlling a flow of diesel fuel from said fuel tank to said reforming catalyst;

a water flow controller for controlling a flow of water from said water tank to said reforming catalyst;

an engine speed detector for detecting an engine speed of said diesel engine;

an injection rate detector for detecting an injection rate of diesel fuel to said diesel engine; and a load responsive controller, for calculating a load on said diesel engine based on a thus detected engine speed and a thus detected fuel injection rate, and for outputting supply flow signals to said fuel flow controller and said water flow controller, respectively, based on a thus calculated load.

11. An exhaust emission control device for a diesel engine in accordance with claim 10, further comprising:

a reforming catalyst temperature detector for detecting a temperature of said reforming catalyst; and wherein said load responsive controller outputs supply flow signals to said fuel flow controller and said water flow controller, respectively, based on the thus calculated load and a thus detected temperature of said reforming catalyst.

12. An exhaust emission control device for a diesel engine in accordance with claim 10, further comprising:

an atmospheric temperature detector for detecting an atmospheric temperature; and wherein said load responsive controller outputs supply flow signals to said fuel flow controller and said water flow controller, respectively, based on the thus calculated load and a thus detected atmospheric temperature.

13. An exhaust emission control device for a diesel engine in accordance with claim 10, further comprising:

an inlet temperature detector for detecting an inlet temperature of said $NO_x$ catalyst; and wherein said load responsive controller receives a temperature signal from said inlet temperature detector and outputs respective supply flow signals to said fuel flow controller and said water flow controller, based on the thus calculated load and a thus detected inlet temperature.

14. An exhaust emission control device for a diesel engine in accordance with claim 10, further comprising at least one of:

a reforming catalyst temperature detector for detecting a temperature of said reforming catalyst;

an atmospheric temperature detector for detecting an atmospheric temperature; and an inlet temperature detector for detecting an inlet temperature of said $NO_x$ catalyst; and wherein said load responsive controller receives a temperature signal from said at least one and outputs respective supply flow signals to said fuel flow controller and said water flow controller, based on the thus calculated load and a thus detected temperature which is detected by said at least one.

15. An exhaust emission control device for a diesel engine in accordance with claim 1, further comprising:

a fuel flow control valve in said pipings for controlling a flow of diesel fuel from said fuel tank to said reforming catalyst;

a water flow control valve in said pipings for controlling a flow of water from said water tank to said reforming catalyst;

an inlet temperature detector for detecting an inlet temperature of said $NO_x$ catalyst; and a controller for receiving a temperature signal from said inlet temperature detector and for outputting respective supply flow signals to said fuel flow control valve and said water flow control valve.

16. An exhaust emission control device for a diesel engine in accordance with claim 15, further comprising:

a reducing agent adding nozzle disposed in said exhaust pipe at a position upstream from said $NO_x$ catalyst; and wherein said reforming catalyst is disposed in said pipings upstream of said reducing agent adding nozzle and downstream of said fuel tank and said water tank.

17. An exhaust emission control device for a diesel engine in accordance with claim 16, further comprising:

an engine speed detector for detecting a speed of said diesel engine; and an injection rate detector for detecting an injection rate of diesel fuel to said diesel engine;

wherein said controller calculates a load on said diesel engine based on a thus detected speed and a thus detected fuel injection rate, and outputs supply flow signals to said fuel flow control valve and said water flow control valve, respectively, based on a thus calculated load.

18. An exhaust emission control device for a diesel engine in accordance with claim 17, further comprising:

a reforming catalyst temperature detector for detecting a temperature of said reforming catalyst; and an atmospheric temperature detector for detecting an atmospheric temperature;

wherein said controller outputs supply flow signals to said fuel flow control valve and said water flow control valve, respectively, based on the thus calculated load and at least one of the temperatures thus detected by said reforming catalyst temperature detector and said atmospheric temperature detector.

19. An exhaust emission control device for a diesel engine in accordance with claim 15, further comprising:

a reforming catalyst temperature detector for detecting a temperature of said reforming catalyst;

said controller receiving a temperature signal from said reforming catalyst temperature detector and from said inlet temperature detector, and outputting supply flow signals to said fuel flow control valve and to said water flow control valve, respectively.

20. An exhaust emission control device for a diesel engine in accordance with claim 15, further comprising:

a reforming catalyst nozzle disposed in said exhaust pipe at a position upstream from said $NO_x$ catalyst; and wherein said reforming catalyst is attached at said reforming catalyst nozzle; and wherein said pipings connect said fuel tank and said water tank to said reforming catalyst nozzle.

21. An exhaust emission control device for a diesel engine in accordance with claim 20, further comprising:

an engine speed detector for detecting an engine speed of said diesel engine; and an injection rate detector for detecting an injection rate of diesel fuel to said diesel engine; and wherein said controller calculates a load on said diesel engine based on a thus detected engine speed and a thus detected fuel injection rate, and outputs supply flow signals to said fuel flow control valve and said water flow control valve, respectively, based on a thus calculated load.

22. An exhaust emission control device for a diesel engine in accordance with claim 21, further comprising:

a reforming catalyst temperature detector for detecting a temperature of said reforming catalyst; and an atmospheric temperature detector for detecting an atmospheric temperature; and wherein said controller outputs supply flow signals to said fuel flow control valve and said water flow control valve, respectively, based on a thus calculated load and at least one of the temperatures detected by said reforming catalyst temperature detector, said atmospheric temperature detector, and said inlet temperature detector.

23. An exhaust emission control device for a diesel engine in accordance with claim 1, wherein said reforming catalyst has its active components carried and held on a metal carrier.

24. An exhaust emission control device for a diesel engine in accordance with claim 1, wherein an air piping, for burning carbon deposited on said reforming catalyst, is connected to said reforming catalyst.

25. An exhaust emission control device for a diesel engine having an exhaust pipe, said exhaust emission control device comprising:

a fuel tank for containing diesel fuel;

a water tank for containing water;

a source of pressurized air;

a reforming catalyst for reforming diesel fuel to reducing agents, said reforming catalyst being a reforming catalyst which reforms either a mixture of diesel fuel and water or a mixture of diesel fuel, water, and air to at least one oxygen-containing reducing agent;

pipings for supplying to said reforming catalyst diesel fuel from said fuel tank, water from said water tank, and pressurized air from said source of pressurized air, and for supplying resulting reducing agents into said exhaust pipe at a supplying position; and a $NO_x$ catalyst which is disposed in said exhaust pipe at a position downstream from said supplying position, and which reduces and controls $NO_x$ in exhaust gas from the diesel engine.

26. An exhaust emission control device for a diesel engine in accordance with claim 25, wherein said reforming catalyst is disposed in said exhaust pipe at a position upstream from said $NO_x$ catalyst.

27. An exhaust emission control device for a diesel engine in accordance with claim 26, further comprising:

a reforming catalyst nozzle disposed in said exhaust pipe at a position upstream from said $NO_x$ catalyst; and wherein said reforming catalyst is attached at said reforming catalyst nozzle; and wherein said pipings connect said fuel tank, said water tank, and said source of pressurized air to said reforming catalyst nozzle.

28. An exhaust emission control device for a diesel engine in accordance with claim 27, further comprising:

a fuel flow controller for controlling a flow of diesel fuel from said fuel tank to said reforming catalyst;

a water flow controller for controlling a flow of water from said water tank to said reforming catalyst;

an air flow controller for controlling a flow of water from said source of pressurized air to said reforming catalyst;

an engine speed detector for detecting an engine speed of said diesel engine;

an injection rate detector for detecting an injection rate of diesel fuel to said diesel engine; and a load responsive controller, for calculating a load on said diesel engine based on a thus detected engine speed and a thus detected fuel injection rate, and for outputting supply flow signals to said fuel flow controller, said water flow controller, and said air flow controller, respectively, based on a thus calculated load.

29. An exhaust emission control device for a diesel engine in accordance with claim 28, further comprising:

a reforming catalyst temperature detector for detecting a temperature of said reforming catalyst; and wherein said load responsive controller outputs supply flow signals to said fuel flow controller, said water flow controller, and said air flow controller, respectively, based on the calculated load and a thus detected temperature of said reforming catalyst.

30. An exhaust emission control device for a diesel engine in accordance with claim 28, further comprising:

an atmospheric temperature detector for detecting an atmospheric temperature; and wherein said load responsive controller outputs supply flow signals to said fuel flow controller, said water flow controller, and said air flow controller, respectively, based on the calculated load and a thus detected atmospheric temperature.

31. An exhaust emission control device for a diesel engine in accordance with claim 28, further comprising:

an inlet temperature detector for detecting an inlet temperature of said $NO_x$ catalyst; and wherein said load responsive controller receives a temperature signal from said inlet temperature detector and outputs respective supply flow signals to said fuel flow controller, said water flow controller, and said air flow controller, based on the thus calculated load and a thus detected inlet temperature.

32. An exhaust emission control device for a diesel engine in accordance with claim 28, further comprising at least one of:

a reforming catalyst temperature detector for detecting a temperature of said reforming catalyst;

an atmospheric temperature detector for detecting an atmospheric temperature; and an inlet temperature detector for detecting an inlet temperature of said $NO_x$ catalyst; and wherein said load responsive controller receives a temperature signal from said at least one and outputs respective supply flow signals to said fuel flow controller, said water flow controller, and said air flow controller, based on the thus calculated load and a thus detected temperature which is detected by said at least one.

33. An exhaust emission control device for a diesel engine in accordance with claim 25, further comprising:

a fuel flow controller for controlling a flow of diesel fuel from said fuel tank to said reforming catalyst;

a water flow controller for controlling a flow of water from said water tank to said reforming catalyst;

an air flow controller for controlling a flow of air from said source of pressurized air to said reforming catalyst;

an engine speed detector for detecting an engine speed of said diesel engine;

an injection rate detector for detecting an injection rate of diesel fuel to said diesel engine; and a load responsive controller, for calculating a load on said diesel engine based on a thus detected engine speed and a thus detected fuel injection rate, and for outputting supply flow signals to said fuel flow controller, said water flow controller, and said air flow controller, respectively, based on a thus calculated load.

34. An exhaust emission control device for a diesel engine in accordance with claim 33, further comprising:

a reforming catalyst temperature detector for detecting a temperature of said reforming catalyst; and wherein said load responsive controller outputs supply flow signals to said fuel flow controller, said water flow controller, and said air flow controller, respectively, based on the thus calculated load and a thus detected temperature of said reforming catalyst.

35. An exhaust emission control device for a diesel engine in accordance with claim 33, further comprising:

an atmospheric temperature detector for detecting an atmospheric temperature; and wherein said load responsive controller outputs supply flow signals to said fuel flow controller, said water flow controller, and said air flow controller, respectively, based on the thus calculated load and a thus detected atmospheric temperature.

36. An exhaust emission control device for a diesel engine in accordance with claim 33, further comprising:

an inlet temperature detector for detecting an inlet temperature of said $NO_x$ catalyst; and wherein said load responsive controller receives a temperature signal from said inlet temperature detector and outputs respective supply flow signals to said fuel flow controller, said water flow controller, and said air flow controller, based on the thus calculated load and a thus detected inlet temperature.

37. An exhaust emission control device for a diesel engine in accordance with claim 33, further comprising at least one of:

a reforming catalyst temperature detector for detecting a temperature of said reforming catalyst;

an atmospheric temperature detector for detecting an atmospheric temperature; and an inlet temperature detector for detecting an inlet temperature of said $NO_x$ catalyst; and wherein said load responsive controller receives a temperature signal from said at least one and outputs respective supply flow signals to said fuel flow controller, said water flow controller, and said air flow controller, based on the thus calculated load and a thus detected temperature which is detected by said at least one.

38. An exhaust emission control device for a diesel engine in accordance with claim 33, wherein in order to regenerate said reforming catalyst, said load responsive controller outputs a command to said air flow controller to supply air to said reforming catalyst at a time when said load responsive controller outputs commands to said fuel flow controller and said water flow controller to stop supplying diesel fuel and water to said reforming catalyst.

39. An exhaust emission control device for a diesel engine in accordance with claim 25, further comprising:

a fuel flow control valve in said pipings for controlling a flow of diesel fuel from said fuel tank to said reforming catalyst;

a water flow control valve in said pipings for controlling a flow of water from said water tank to said reforming catalyst;

an air flow control valve in said pipings for controlling a flow of air from said source of pressurized air to said reforming catalyst;

an inlet temperature detector for detecting an inlet temperature of said $NO_x$ catalyst; and a controller for receiving a temperature signal from said inlet temperature detector and for outputting respective supply flow signals to said fuel flow control valve, said water flow control valve, and said air flow control valve.

40. An exhaust emission control device for a diesel engine in accordance with claim 39, further comprising:

a reducing agent adding nozzle disposed in said exhaust pipe at a position upstream from said $NO_x$ catalyst; and wherein said reforming catalyst is disposed in said pipings upstream of said reducing agent adding nozzle and downstream of said fuel tank, said water tank, and said source of pressurized air.

41. An exhaust emission control device for a diesel engine in accordance with claim 40, further comprising:

an engine speed detector for detecting a speed of said diesel engine; and an injection rate detector for detecting an injection rate of diesel fuel to said diesel engine;

wherein said controller calculates a load on said diesel engine based on a thus detected speed and a thus detected fuel injection rate, and outputs supply flow signals to said fuel flow control valve, said water flow control valve, and said air flow control valve, respectively, based on a thus calculated load.

42. An exhaust emission control device for a diesel engine in accordance with claim 41, further comprising:

a reforming catalyst temperature detector for detecting a temperature of said reforming catalyst; and an atmospheric temperature detector for detecting an atmospheric temperature;

wherein said controller outputs supply flow signals to said fuel flow control valve, said water flow control valve, and said air flow control valve, respectively, based on the thus calculated load and at least one of the temperatures thus detected by said reforming catalyst temperature detector and said atmospheric temperature detector.

43. An exhaust emission control device for a diesel engine in accordance with claim 39, further comprising:

a reforming catalyst temperature detector for detecting a temperature of said reforming catalyst;

said controller receiving a temperature signal from said reforming catalyst temperature detector and from said inlet temperature detector, and outputting supply flow signals to said fuel flow control valve, said water flow control valve, and said air flow control valve, respectively.

44. An exhaust emission control device for a diesel engine in accordance with claim 39, further comprising:

a reforming catalyst nozzle disposed in said exhaust pipe at a position upstream from said $NO_x$ catalyst; and wherein said reforming catalyst is attached at said reforming catalyst nozzle; and wherein said pipings connect said fuel tank, said water tank, and said source of pressurized air to said reforming catalyst nozzle.

45. An exhaust emission control device for a diesel engine in accordance with claim 44, further comprising:

an engine speed detector for detecting an engine speed of said diesel engine; and an injection rate detector for detecting an injection rate of diesel fuel to said diesel engine; and wherein said controller calculates a load on said diesel engine based on a thus detected engine speed and a thus detected fuel injection rate, and outputs supply flow signals to said fuel flow control valve, said water flow control valve, and said air flow control valve, respectively, based on a thus calculated load.

46. An exhaust emission control device for a diesel engine in accordance with claim 45, further comprising:

a reforming catalyst temperature detector for detecting a temperature of said reforming catalyst; and an atmospheric temperature detector for detecting an atmospheric temperature; and wherein said controller outputs supply flow signals to said fuel flow control valve, said water flow control valve, and said air flow control valve, respectively, based on a thus calculated load and at least one of the temperatures detected by said reforming catalyst temperature detector, said atmospheric temperature detector, and said inlet temperature detector.

47. An exhaust emission control device for a diesel engine in accordance with claim 25, wherein said reforming catalyst has its active components carried and held on a metal carrier.

48. An exhaust emission control device for a diesel engine in accordance with claim 25, wherein an air piping, for burning carbon deposited on said reforming catalyst, is connected to said reforming catalyst.

49. An exhaust emission control device for a diesel engine in accordance with claim 25, wherein said source of pressurized air is boost pressure provided by a turbocharger attached to said diesel engine.

50. An exhaust emission control device for a diesel engine in accordance with claim 25, wherein said reforming catalyst has its active components carried and held on a metal carrier, and wherein said oxygen-containing reducing agent includes an alcohol having at least two carbon atoms per molecule.

* * * * *